Nov. 15, 1938.　　　　　H. C. DRAKE　　　　　2,136,914

MEANS FOR DETECTING FLAWS

Filed April 21, 1933

Inventor

Harcourt C. Drake

By Joseph H. Lipschutz

Attorney

Patented Nov. 15, 1938

2,136,914

UNITED STATES PATENT OFFICE 2,136,914

MEANS FOR DETECTING FLAWS

Harcourt C. Drake, Hempstead, N. Y., assignor to Sperry Products, Inc., Brooklyn, N. Y., a corporation of New York Application April 21, 1933, Serial No. 667,145

14 Claims. (Cl. 175—183)

This invention relates to means for detecting defects within electrical conductors and magnetizable objects. The principle which I employ herein utilizes the fact that when the object being tested is energized with magnetic or electromagnetic flux such flux is uniform as long as the object is free of defects, but when a defective portion occurs there is a change in flux. I cause such change in flux to effect movement of a member to give an indication of the presence of a defect.

Further objects and advantages of my invention will become apparent in the following detailed description thereof.

In the accompanying drawing.

Figure 1:
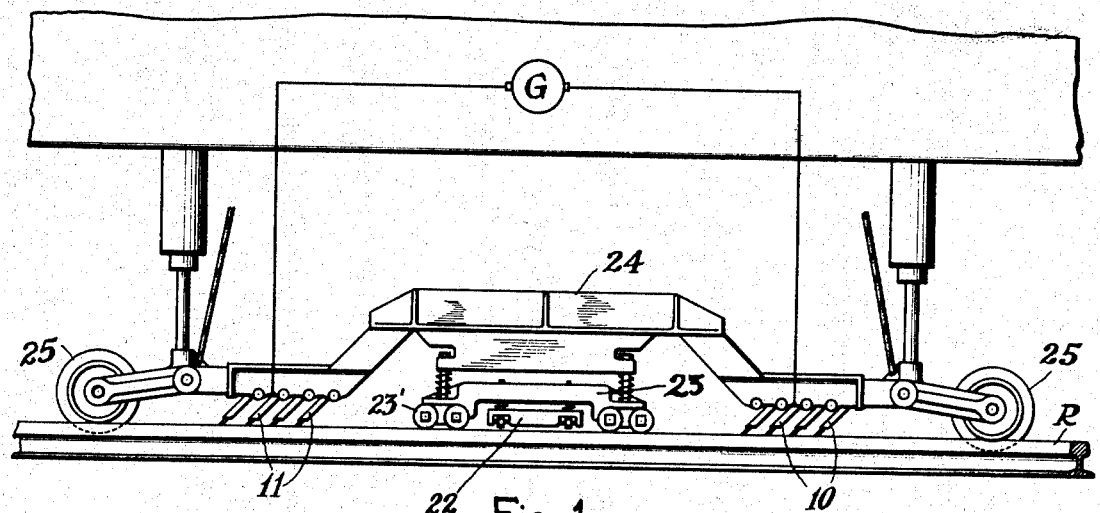
Fig. 1 is a side elevation of a portion of a detector car adapted to test rails in track and showing one form of my invention applied thereto.

Referring first to Fig. 1 of the drawing, I have shown an object under test, in this case a rail R, through which current is adapted to be passed by means such as generator G supplying current to sets of contacts 10 and 11 in engagement with the conductor. A conductor so energized with current will have an electromagnetic field surrounding the same, the plane of said field being transverse to the conductor and the direction of current flow.

I utilize the flux in the electromagnetic field surrounding the conductor to establish a magnetic circuit which will include a core in the form of an inverted U, the conductor forming the closure for the arms of the U. Said U-shaped core may contain a movable element such as, for instance, the element 20 having a forked end which engages over a fixed arm 21, said arm being fixedly supported within a frame 22 which is in turn supported on the conductor by means such as carriage 23 and wheels 23', the frame 22 being supported in a current brush carriage 24 which engages the conductor by means such as wheels 25. The said movable member 20 is pivoted on pivot 26 in said frame 22 and is normally biased away from the conductor by means such as a leaf spring 27 fixed at one end to arm 21 of the U and pressing at its other end on the movable member 20. The upward movement of said member 20 may be limited by means of a stop 29 which is adjustably threaded through 20 and engages the member 21 when said movable member is raised. The U-shaped magnet is positioned transverse to the conductor, that is, in the plane of the electromagnetic field so that flux normally traverses the U-shaped member and the conductor forming the magnetic path. The movable member 20 is normally held in lowered position by the flux through said U. If the flux through said U is not sufficient normally to maintain the movable member 20 in lowered position against the action of spring 27, a coil 30 may be wrapped around said movable member and energized from any suitable source of current such as battery 31 to increase the flux in the magnetic circuit sufficiently to cause movable member 20 to be attracted by the other arm 31' of the U to move the same to lowered position.

As the device carrying the member forming the magnetic path is moved relative to the conductor in the direction parallel to the current flow through the conductor, the flux through the magnetic circuit will be constant as long as the conductor is free of defects. As soon as a region of flaw is encountered, however, the flux in said region is diminished and therefore the flux through the magnetic circuit is diminished and is no longer sufficient to hold member 20 downwardly against the action of spring 27. Said member then springs upwardly. Said upward movement may be suitably indicated, as by means of the following arrangement: The upward movement of member 20 may be caused to close contacts 33 to energize a relay 34 which in turn may close contacts 35 to energize the relay 36 which operates a pen 37 in engagement with a moving chart.

In order to expedite the return of member 20 to its lowered position as soon as the region of flaw has been passed, I may provide a parallel circuit designed to be closed by energization of relay 34. Said circuit is closed by closing of contacts 35 to energize a coil 40 wrapped around the other leg 31' of the U-shaped magnet member so that said coil is energized when relay 34 is energized to increase the flux through the magnetic circuit and thus pull member 20 downwardly to its initial position.

Figure 3:
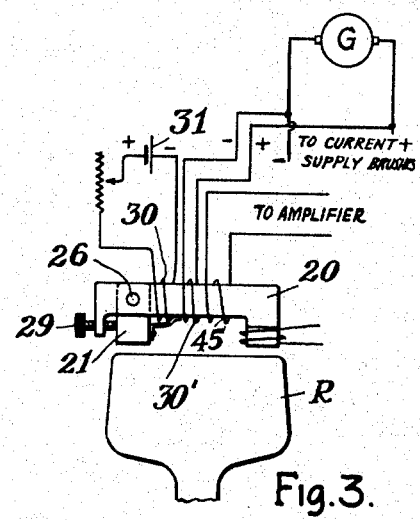
Fig. 3 is a view similar to Fig. 2 showing a slightly modified form of this invention.
Figure 5:
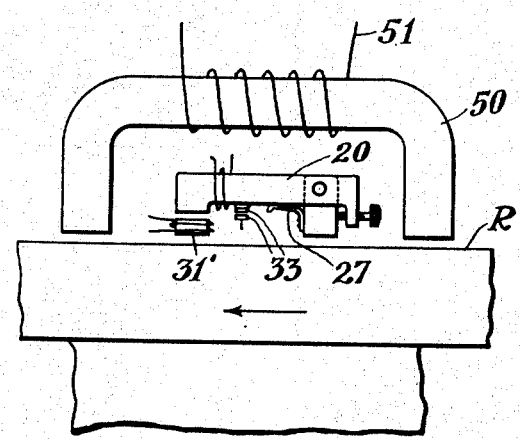
Fig. 5 is a side elevation of a conductor under test illustrating a modified form of my invention.

In Fig. 3 I have shown a modified form of my invention wherein I utilize the fact that the flux through the magnetic circuit decreases in a region of flaw, and I cause the decreased flux to act upon an induction coil 45 so that an indication of the E. M. F. induced thereby may be an index of the flaw. It will be seen that any variation of flux through the magnetic circuit will induce an E. M. F. in coil 45 wound around said member and said induced E. M. F. may be caused to operate an indicator such as pen 37 which is actuated from coil 36 which may be connected to the output of an amplifier the input of which is formed by the induced E. M. F. in coil 45. Such change of flux is multiplied by the fact that the upward movement of member 20 will multiply the rate at which the flux through coil 45 is changing and will thus multiply the induced E. M. F. in said coil.

Figure 4:
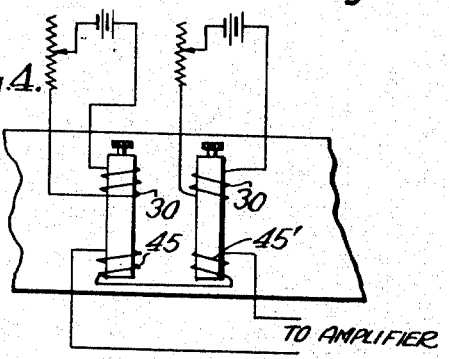
Fig. 4 is a plan view applicable to the Fig. 3 form of the invention when two testing devices are connected in opposition.

I may mount within supporting frame 22 two such detecting mechanisms, and by opposing the windings 45 and 45' (see Fig. 4) on the respective movable members 20 I may render such a device immune from false indications due to changes in the amount of current supplied from the source of supply G, since any change in current will have equal and opposite effect upon the coils 45, 45' which are equal and oppositely wound.

Another method whereby variations in current supply do not affect the detecting mechanism is disclosed in Fig. 3, and consists of an additional winding 30' connected in parallel to the current source G. Said coil 30' is oppositely connected, and has the same number of turns as coil 45, so that a variation in current supplied to the conductor R under test which acts upon coil 45 has no effect upon the indicating system because such change in current supply acts upon coil 30' which has an equal and opposite effect on coil 45.

Figure 2:
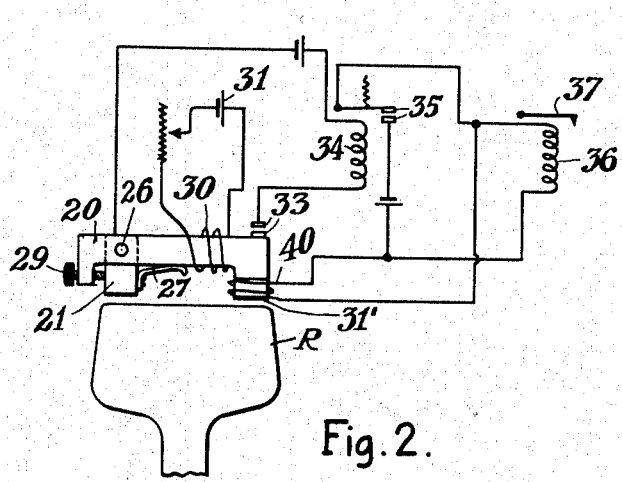
Fig. 2 is a vertical section through a portion of the Fig. 1 form of the device, partly diagrammatic, to illustrate the principle embodied in this invention.

The principle of my invention which has been illustrated above in connection with energization of the conductor under test by electric current to set up an electromagnetic field surrounding the conductor transverse to the direction of current may be applied also to the case where the conductor is energized by magnetism and the flux is in the direction of the arrow through the conductor under test. In this case, the conductor R may be energized by means of a magnet 50 which may have a magnetic circuit established therein by means such as energizing coil 51, the conductor forming the closure for said magnetic circuit. Here, too, a movable member 20 forms part of a magnetic circuit, the remainder of the circuit being formed by arm 31' of the U-shaped member and the conductor. In this case the magnetic circuit is at right angles to the position it occupied in the case where the conductor was energized with electric current because the flux is in the plane of the paper instead of in a plane transverse thereto. In the case of magnetic flux, a region of flaw will cause an increase of flux in the magnetic circuit including movable member 20 and therefore said member will be drawn downwardly against the action of spring 27. For this reason the member 20 is normally spaced from arm 31' so as to provide a gap. The same type of indicating means may be employed as in the Fig. 2 form, such as, for instance, the set of contacts 33 for energizing pen 37.

In accordance with the provisions of the patent statutes I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A device for detecting flaws in electrical conductors, comprising means for passing electric current through the conductor under test to establish an electromagnetic field surrounding the same, means positioned in said field for establishing a magnetic circuit, said circuit including the conductor, a movable member in said circuit adapted to move in response to variations in flux in said circuit, an induction coil carried by said movable member and means for indicating the induced voltages in said coil.

2. A device for detecting flaws in electrical conductors, comprising means for passing electric current through the conductor under test to establish an electromagnetic field surrounding the same, a plurality of means positioned in said field for establishing magnetic circuits, each of said circuits including the conductor, a movable member in each circuit adapted to move in response to variations in flux in said circuit, an induction coil carried by each movable member, and means for comparing the induced voltages in said coils.

3. A device for detecting flaws in electrical conductors, comprising means for passing electric current through the conductor under test to establish an electromagnetic field surrounding the same, a plurality of means positioned in said field for establishing magnetic circuits, each of said circuits including the conductor, a movable member in each circuit adapted to move in response to variations in flux in said circuit, an induction coil carried by each movable member, said coils being equal and oppositely connected, and an indicator adapted to be actuated by the differential output of said coils.

4. A device for detecting flaws in electrical conductors, comprising means for passing electric current through the conductor under test to establish an electromagnetic field surrounding the same, means positioned in said field for establishing a magnetic circuit, said circuit including the conductor, a movable member in said circuit, the flux in said circuit attracting said member toward said conductor, and means for moving said member away from said conductor when the flux through said circuit is diminished by the presence of a region of flaw.

5. A device for detecting flaws in electrical conductors, comprising means for passing electric current through the conductor under test to establish an electromagnetic field surrounding the same, means positioned in said field for establishing a magnetic circuit, said circuit including the conductor, a movable member in said circuit, the flux in said circuit attracting said member toward said conductor, means for moving said member away from said conductor when the flux through said circuit is diminished by the presence of a region of flaw, and means for restoring said member to normal position.

6. A device for detecting flaws in electrical conductors, comprising means for passing electric current through the conductor under test to establish an electromagnetic field surrounding the same, means positioned in said field for establishing a magnetic circuit, said circuit including the conductor, a movable member in said circuit, the flux in said circuit attracting said member toward said conductor, means for moving said member away from said conductor when the flux through said circuit is diminished by the presence of a region of flaw, an indicator adapted to be actuated in response to movements of said indicator, and means for restoring said member to normal position after said indicator has been actuated.

7. A device for detecting flaws in electrical conductors, comprising means for passing electric current through the conductor under test to establish an electromagnetic field surrounding the same, means positioned in said field for establishing a magnetic circuit, said circuit including the conductor, a member movable in said circuit, means for moving said member away from said conductor, the flux in said circuit attracting said member toward said conductor, and a separate source of flux for increasing the flux through said circuit to permit said movable member to overcome the action of said means for moving said member away from the conductor.

8. A device for detecting flaws in electrical conductors, comprising means for passing electric current through the conductor under test to establish an electromagnetic field surrounding the same, means positioned in said field for establishing a magnetic circuit, said circuit including the conductor, a member movable in said circuit, means for moving said member away from said conductor, the flux in said circuit attracting said member toward said conductor, and a separate source of flux, including a coil carried by said member and a source of current for energizing said coil, for increasing the flux through said circuit to permit said movable member to overcome the action of said means for moving said member away from the conductor.

9. A device for detecting flaws in electrical conductors, comprising means for passing electric current through the conductor under test to establish an electromagnetic field surrounding the same, means positioned in said field for establishing a magnetic circuit, said circuit including the conductor, a movable member in said circuit adapted to move in response to variations in flux in said circuit, and means carried by said movable member whereby the effect of variations in current supply is counteracted.

10. A device for detecting flaws in electrical conductors, comprising means for passing electric current through the conductor under test to establish an electromagnetic field surrounding the same, means positioned in said field for establishing a magnetic circuit, said circuit including the conductor, a movable member in said circuit adapted to move in response to variations in flux in said circuit, an induction coil carried by said movable member, means for indicating the induced voltages in said coil, and means carried by said movable member whereby the effect on said induction coil of variations in current supply is counteracted.

11. A device for detecting flaws in electrical conductors, comprising means for passing electric current through the conductor under test to establish an electromagnetic field surrounding the same, means positioned in said field for establishing a magnetic circuit, said circuit including the conductor, a movable member in said circuit adapted to move in response to variations in flux in said circuit, an induction coil carried by said movable member, means for indicating the induced voltages in said coil, and means carried by said movable member whereby the effect on said induction coil of variations in current supply is counteracted, said last-named means comprising a coil connected to the current supply means to be affected equally and oppositely to said induction coil.

12. A device for detecting flaws in electrical conductors comprising means for passing electric current through the conductor under test to establish an electromagnetic field surrounding the same, means positioned in said field for establishing a magnetic circuit, said circuit including the conductor, a movable member in said circuit adapted to be moved in a given direction in response to normal flux in said circuit, and means normally tending to move said member in a different direction, said last-named means being adapted to become effective when the presence of flaws in said conductor varies the flux in said circuit.

13. A device for detecting flaws in electrical conductors comprising means for passing electric current through the conductor under test to establish an electromagnetic field surrounding the same, means positioned in said field for establishing a magnetic circuit, said circuit including a conductor, means whereby said first two means are moved relative to said conductor in constant relation thereto, a movable member in said circuit adapted to be moved in a given direction in response to normal flux in said circuit, and means normally tending to move said member in a different direction, said last-named means being adapted to become effective when the presence of flaws in said conductor varies the flux in said circuit.

14. A device for detecting flaws in electrical conductors comprising means for passing electric current through the conductor under test to establish an electromagnetic field surrounding the same, means positioned in said field for establishing a magnetic circuit, sair circuit including a conductor, means whereby said first two means are moved relative to said conductor in constant relation thereto, a movable member in said circuit adapted to be moved in a given direction in response to normal flux in said circuit, means normally tending to move said member in a different direction, said last-named means being adapted to become effective when the presence of flaws in said conductor varies the flux in said circuit, and an indicator adapted to be actuated in response to movements of said member.

HARCOURT C. DRAKE.